US008077659B2

(12) United States Patent
Yousef (10) Patent No.: US 8,077,659 B2
(45) Date of Patent: Dec. 13, 2011

(54) METHOD AND APPARATUS FOR LOCATING MOBILE MULTIMEDIA MULTICAST SYSTEM CAPABLE WIRELESS DEVICES

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 872 days.

(21) Appl. No.: 12/110,671

(22) Filed: Apr. 28, 2008

(65) Prior Publication Data

US 2009/0268665 A1 Oct. 29, 2009

(51) Int. Cl.
*H04W 4/00* (2009.01)
(52) U.S. Cl. ........ 370/328; 370/208; 370/281; 370/295; 370/310.2; 370/480; 455/112; 455/216; 455/404.2; 455/422.1; 455/440; 455/441; 455/456.1; 455/457; 340/988; 340/989; 340/991; 340/992; 340/993; 342/450; 342/451; 342/453; 342/463; 342/464; 342/465
(58) Field of Classification Search .................. 370/208, 370/210, 281, 295, 310.2, 328–339, 349, 370/480; 455/59, 60, 112, 216, 404.2, 422.1, 455/440, 441, 456.1, 457; 340/988–993; 342/450–453, 463–465
See application file for complete search history.

(56) References Cited

U.S. PATENT DOCUMENTS

| 6,539,229 B1* | 3/2003 | Ali .............................. 455/456.1 |
| 2008/0126420 A1* | 5/2008 | Wright et al. .............. 707/104.1 |
| 2008/0248813 A1* | 10/2008 | Chatterjee .................. 455/456.2 |
| 2009/0116422 A1* | 5/2009 | Chong et al. ................. 370/315 |

OTHER PUBLICATIONS

3GPP TS 25.305 v7.3.0 (Jun. 2006)—3rd Generation Partnership Project; Technical Specification Group Radio Access Network; Stage 2 functional specification of User Equipment (UE) positioning in UTRAN (Release 7), Jun. 2006, 3GPP.*
Chari et al., FLO Physical Layer: An Overview—IEEE Transactions on Broadcasting, vol. 53, No. 1, Mar. 2007, IEEE, p. 145-160.*
Wang et al., Location Based Services for Mobiles: Technologies and Standards, May 19-23, 2008, IEEE ICC 2008.*
Luo, Mobile Multimedia Broadcasting Standards: Technology and Practice, Nov. 6, 2008, Springer.*
Schwieger, Positioning within the GSM Network—Coastal Areas and Land Administration—Building the Capacity, 6th FIG Regional Conference, San Jose, Costa Rica, Nov. 12-15, 2007, TS 08—Positioning and Measurement.*

* cited by examiner

*Primary Examiner* — Aung S Moe
*Assistant Examiner* — Hoon J Chung
(74) *Attorney, Agent, or Firm* — Rahman LLC (57) ABSTRACT

Estimating a current location of a receiver in a MediaFLO™ (Forward Link Only) mobile multimedia multicast system comprises receiving digital signals comprising a MediaFLO™ superframe comprising orthogonal frequency division multiplexing (OFDM) symbols; performing slot 3 processing of each medium access control (MAC) time unit of a data channel to identify a transmitter identity (TxID) of each transmitter; identifying corresponding geographical coordinates of each TxID; regenerating the digital signals for each of the transmitters using a local-area differentiator (LID) and a wide-area differentiator (WID) of the transmitters; dividing the digital signals by the corresponding regenerated transmitted signal to obtain channel estimates between the receiver and the corresponding transmitters; detecting a first peak in the channel estimates to determine a distance between the receiver and the corresponding transmitters; calculating a time difference of arrival of the digital signals; and estimating a current location of the receiver.

20 Claims, 9 Drawing Sheets

METHOD AND APPARATUS FOR LOCATING MOBILE MULTIMEDIA MULTICAST SYSTEM CAPABLE WIRELESS DEVICES

BACKGROUND

1. Technical Field

The embodiments herein generally relate to wireless communications, and, more particularly, to a method and apparatus for estimating the current location of a receiver in a MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting—Terrestrial (ISDB-T), Terrestrial-Digital Multimedia Broadcasting (T-DMB), Satellite—Digital Multimedia Broadcasting (S-DMB), Digital Video Broadcasting—Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data. Multi-media streams may be various channels coming from different sources. In order for the reception to be more efficient such that power control of the signal carrying the multimedia streams may be achieved, knowledge of the geographical position of the receiver is desirable.

SUMMARY

In view of the foregoing, an embodiment herein provides a method of estimating a current location of a receiver in a MediaFLO™ (Forward Link Only) mobile multimedia multicast system comprising the receiver, at least three transmitters, and a FLO network, a program storage device readable by computer, tangibly embodying a program of instructions executable by the computer to perform the method of estimating a current location of a receiver in a MediaFLO™ (Forward Link Only) mobile multimedia multicast system comprising the receiver, at least three transmitters, and a FLO network, wherein the method comprises receiving digital signals comprising a MediaFLO™ mobile multimedia multicast system superframe comprising orthogonal frequency division multiplexing (OFDM) symbols; performing slot 3 processing of each medium access control (MAC) time unit of a data channel to identify a transmitter identity (TxID) of each transmitter; identifying corresponding geographical coordinates of each TxID; regenerating the digital signals for each of the transmitters using a local-area differentiator (LID) and a wide-area differentiator (WID) of the transmitters; dividing the digital signals received from the transmitters by the corresponding regenerated transmitted signal to obtain channel estimates between the receiver and the corresponding transmitters; detecting a first peak in the channel estimates to determine a distance between the receiver and the corresponding transmitters; calculating a time difference of arrival of the digital signals emitted from the transmitters; and estimating a current location of the receiver by determining the time difference of arrival associated with geographical coordinates of the receiver.

Preferably, the slot 3 comprises 21 bits of information, wherein 18 bits represents the TxID and 3 bits represents a number of succeeding position pilot channel (PPC) MAC time units allocated to the transmitter transmitting the slot 3. Moreover, identifying the corresponding geographical coordinates of each TxID may comprise receiving a map of the locations of the transmitters and the identifiers of the transmitters broadcasted by the FLO network; storing the map into a memory component of the receiver; and translating the identified TxID of the transmitters to the locations of the transmitters.

The method may further comprise receiving a version number of the map within control information; and updating the map for any modifications. Additionally, the method may further comprise connecting the receiver to the Internet; and updating the map for modifications. Preferably, detecting the first peak in the channel estimates to determine the distance between the receiver and the corresponding transmitters comprises measuring a noise level at slot 5 of the MAC time unit; measuring a signal level of the remaining slots of the MAC time unit; obtaining a level of the signal-to-noise ratio (SNR) of the digital signals; and setting a threshold level to detect each peak in the channel estimates.

Additionally, the calculating of time difference of arrival may comprise determining a difference between a time difference of arrival corresponding to a first transmitter and a time difference of arrival corresponding to a second transmitter, and a difference between a time difference of arrival corresponding to the first transmitter and a time difference of arrival corresponding to a third transmitter. Moreover, the estimating of current location of the receiver may comprise transmitting the values of the time difference of arrival corresponding to the first, second, and third transmitters to the FLO network; and receiving the resulting coordinates indicating the current location of the receiver. Preferably, the receiving of digital signals comprises receiving a bit to indicate whether slot 3 contains any of a transmitter location and the TxID.

Another embodiment includes an apparatus for estimating a current location of a wireless device in a MediaFLO™ (Forward Link Only) mobile multimedia multicast system comprising at least three transmitters in a FLO network, wherein the apparatus comprises a receiver that receives digital signals comprising a MediaFLO™ mobile multimedia multicast system superframe comprising orthogonal frequency division multiplexing (OFDM) symbols; and a processor that: performs slot 3 processing of each medium access control (MAC) time unit of a data channel to identify a transmitter identity (TxID) of each transmitter; identifies corresponding geographical coordinates of each TxID; regenerates the digital signals for each of the transmitters using a local-area differentiator (LID) and a wide-area differentiator (WID) of the transmitters; divides the digital signals received from the transmitters by the corresponding regenerated transmitted signal to obtain channel estimates between the receiver and the corresponding transmitters; detects a first peak in the channel estimates to determine a distance between the receiver and the corresponding transmitters; calculates a time difference of arrival of the digital signals emitted from the transmitters; and estimates a current location of the receiver by determining the time difference of arrival associated with geographical coordinates of the receiver.

Preferably, the slot 3 comprises 21 bits of information, wherein 18 bits represents the TxID and 3 bits represents a number of succeeding position pilot channel (PPC) MAC time units allocated to the transmitter transmitting the slot 3, and wherein the processor receives a map of the locations of the transmitters and the identifiers of the transmitters broadcasted by the FLO network, stores the map into a memory component of the receiver, and translates the identified TxID of the transmitters to the locations of the transmitters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide power control of signals carrying multimedia channels from different sources by utilizing an efficient method of estimating a current location of a receiver. Referring now to the drawings, and more particularly to FIGS. 1 through 9, where similar reference characters denote corresponding features consistently throughout the figures, there are shown preferred embodiments.

Figure 1:
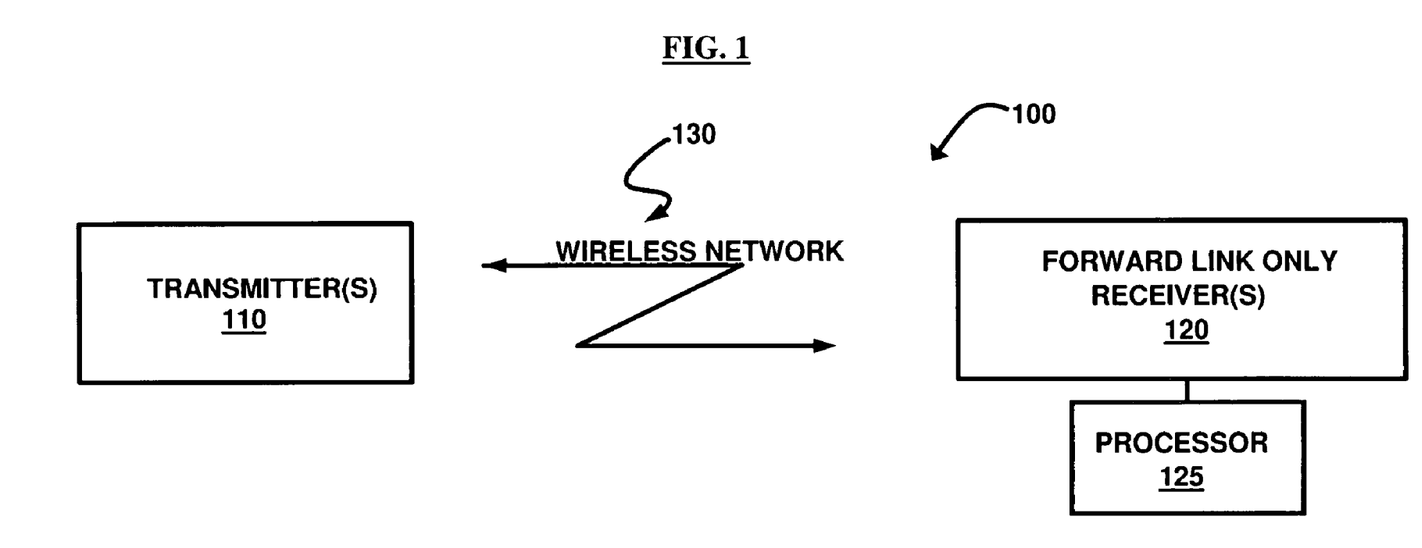
FIG. 1 illustrates a MediaFLO™ system according to an embodiment herein.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120. One or more processors 125 may be operatively connected to the one or more receivers 120 to facilitate processing of computer instructions to be utilized by the one or more receivers 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
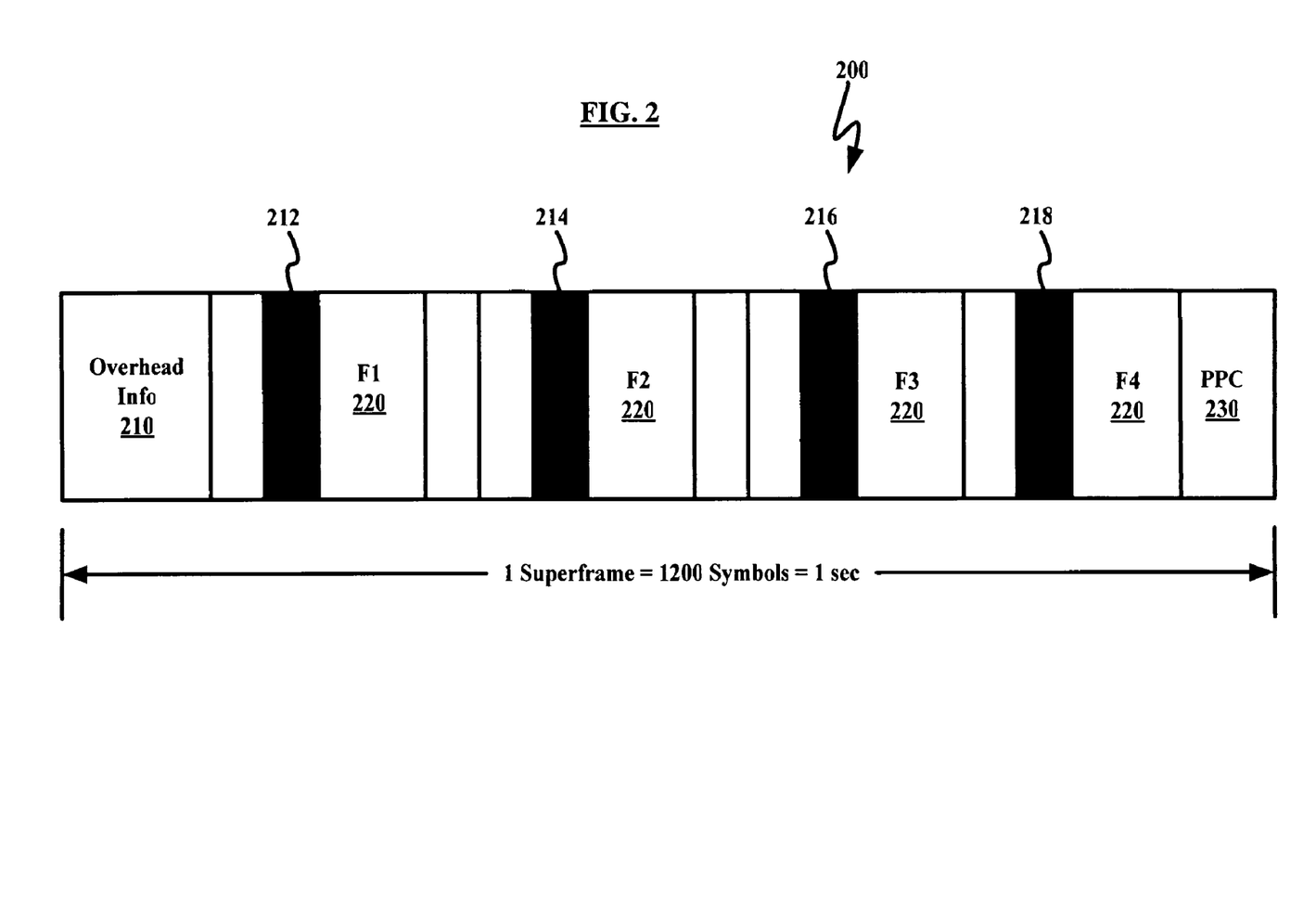
FIG. 2 illustrates a FLO superframe for a MediaFLO™ system according to an embodiment herein.

MLCs are multiplexed to form a superframe. FIG. 2 illustrates a FLO superframe 200 for a MediaFLO™ system. The superframe 200 includes an Overhead Information channel 210, MLCs 212, 214, 216, 218, data channels 220, and a Position Pilot Channel (PPC) 230, wherein the PPC 230 is a collection of OFDM symbols that may appear near the end of the superframe 200, as illustrated in FIG. 2. The PPC 230 may be used by a receiver (e.g., a receiver from the plurality of receivers 120 of FIG. 1) to estimate the received power levels and channel estimates from individual transmitters 110 of FIG. 1.

Each transmitter 110 of FIG. 1 is assigned a unique 18 bit identifier (TxID) that is conveyed in the PPC 230. The TxID may be used by the receiver 120 of FIG. 1 to map the power levels and channel estimates to the geographical location of the transmitter 110 of FIG. 1. Channel estimates from multiple transmitters 110 of FIG. 1 may be used for determining the geographical position of the receiver 120 of FIG. 1.

The PPC 230 spans 8 PPC Medium Access Control (MAC) time units for the 1K, 2K and 4K Fast Fourier Transformation (FFT) size, and for the 8K FFT size, the PPC 230 spans 16 PPC MAC time units. Each PPC MAC time unit contains 8 slots and has the duration of 4, 2, 1 and ½ of a PPC OFDM symbol for the 1K, 2K, 4K and 8K FFT sizes, respectively.

The number of PPC MAC time units and PPC OFDM symbols are as specified in Table 1.

TABLE 1

Position Pilot Duration

| FFT Size | Number of PPC MAC time Units | Number of PPC OFDM Symbols | OFDM symbol duration (chips) | PPC duration (chips) |
|---|---|---|---|---|
| 1024 | 8 | 32 | 1553 | 49696 |
| 2048 | 8 | 16 | 3089 | 49424 |
| 4096 | 8 | 8 | 6161 | 49288 |
| 81921 | 16 | 8 | 12305 | 98440 |

The OFDM symbol contains of a number of time-domain baseband samples called OFDM chips (as indicated in Table 1). These chips are transmitted at a rate of $5.55 \times 10^6$ per second.

As the PPC 230 uses a longer flat guard interval (FGI fraction is equal to ½), the PPC MAC time unit is longer in duration than the MAC time unit in the data channels. In addition, the PPC MAC time units are indexed separately. The PPC MAC time index ranges from 0 to 7 for the 1K, 2K, and 4K FFT sizes, and from 0 to 15 for the 8K FFT size.

During each PPC MAC time unit, a transmitter 110 (of FIG. 1) may be in one of three states: inactive, identification, and reserved. When a transmitter 110 is in the identification or reserved state, neighboring transmitters should be in the inactive state. This means only one transmitter 110 is active per one MAC time unit (active means either in identification or reserved state). The other transmitters broadcasting different channels are inactive.

For the 8K FFT size, PPC MAC time units are assigned to transmitters 110 in consecutive pairs, since each pair corresponds to one PPC OFDM symbol. Hence, during each pair of PPC MAC time units, a transmitter 110 may be in the inactive, identification, or reserved state. For each transmitter 110, the PPC MAC time units in the reserved state follow immediately after PPC MAC time units in the identification state. The number of PPC MAC time units in the reserved state is conveyed during the identification state.

In the identification state there are 8 slots in each MAC time unit for the 1K, 2K and the 4K FFT size. The buffers for slots 0, 2, 4, and 6 are each completely filled with a fixed pattern comprising of 1000 bits, and are scrambled with a Wide-Area Differentiator (WID) and a Local-Area Differentiator (LID). While the buffer for slot 1 is completely filled with a fixed pattern comprising of 1000 bits and are scrambled using the WID only. Slot 3 is used to convey the TxID as well as the number of succeeding PPC MAC time units that are allocated to that transmitter 110 (number of MAC time units that are in reserved state). The buffers for slots 5 and 7 are left empty as no useful data would be sent on these slots.

The same is applied for the 8K FFT size, except that slots 1 and 3 are allocated only in the first PPC MAC time unit. Therefore, the allocated slots are 0, 1, 2, 3, 4, 6 in the first PPC MAC time unit and 0, 2, 4, 6 in the second PPC MAC time unit.

The modulation scheme that is used for the different slots is the quadrature phase-shift keying (QPSK) modulation scheme. The mapping of slots to interlaces may be an identity mapping. In other words, slots 0, 1, 2, 3, 4 and 6 are mapped to interlaces 0, 1, 2, 3, 4, and 6, respectively. The identity mapping is used even when the slot is mapped to multiple interlaces for the 1K and 2K FFT sizes. For the 8K FFT size, the two slots with index k in each PPC OFDM symbol are mapped to interlace k. Slot 3 is used to convey 21 bits of information to the FLO receiver 120: 18 bits for the TxID and 3 bits to convey the number of succeeding PPC MAC time units that are allocated to the transmitter 110.

Figure 3:
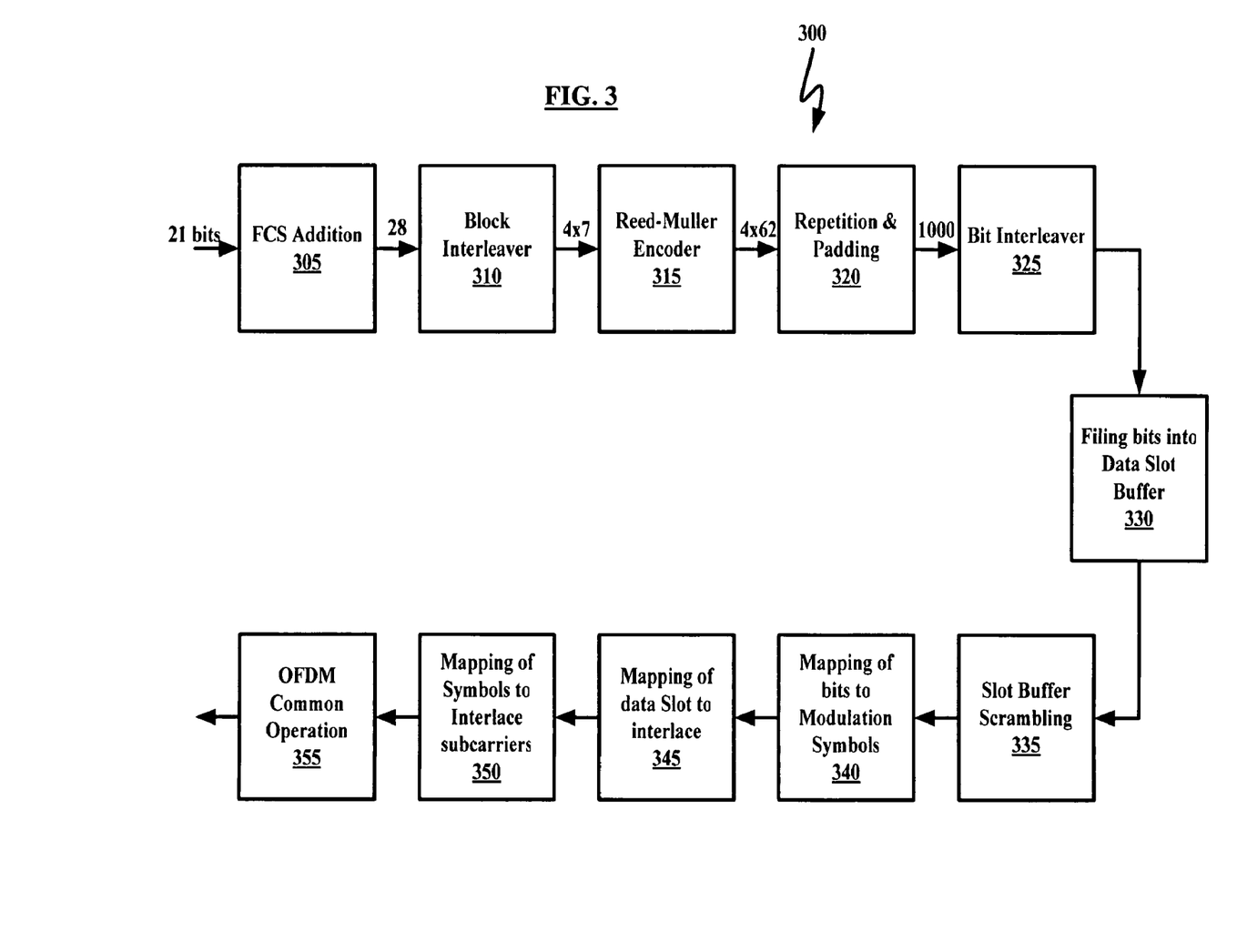
FIG. 3 illustrates slot 3 processing in an identification state according to an embodiment herein.

FIG. 3 illustrates slot 3 processing 300 in an identification state according to an embodiment herein. The 21 bits contained in slot 3 undergo a Frame Check Sequence (FCS) addition process 305, wherein extra check sum bits are added to the PPC bits for error correction and detection. The FCS added bits are then block interleaved 310 so that the bits are arranged in a non-contiguous way in order to increase the performance by converting burst errors into a number of single errors. The resulting bits are then encoded using a Reed-Muller encoder 315 for error correction. The encoded bits then undergo a repetition and padding process 320, wherein the data bits are repeated and padded with (filling) bits. The resulting bits then undergo a bit interleaving process 325 where the interleaving is on the bit level. The interleaved bits are then filled 330 into a data slot buffer. The buffer for the allocated slot is completely filled with a fixed pattern comprising 1000 bits, with each bit set to '0'. The buffers for the un-allocated slots are left empty.

The bits filled into the data slot buffer undergo a slot buffer scrambling process 335. The slot buffer scrambling 335 is performed by adding components to the original signal or by changing some important component of the original signal in order to make extraction of the original signal difficult. The degree of importance of a component is determined by slot buffer scrambling, wherein the bits of each allocated slot buffer are XOR'd sequentially with a variable scrambling sequence to randomize the bits prior to modulation.

The slot buffer scrambled bits are mapped 340 to modulation symbols, wherein each group of two consecutive bits from the scrambled slot buffer are mapped into a complex modulation symbol of QPSK modulation. The resulting bits then undergo a process of mapping 345 of data slot to interlace. There are eight interlaces in each OFDM symbol wherein seven of the interlaces are assigned to data slots 1 through 7. After the mapping 345 of data slot to interlace, the symbols are mapped 350 to interlace subcarriers, wherein each allocated slot contains 500 modulation symbols which are sequentially assigned to 500 interlace subcarriers. The resulting mapped symbols are processed for an OFDM common operation 355. As OFDM is a digital multi-carrier scheme, which uses a large number of closely-spaced orthogonal subcarriers, each subcarrier is modulated with a conventional modulation scheme.

Figure 4:
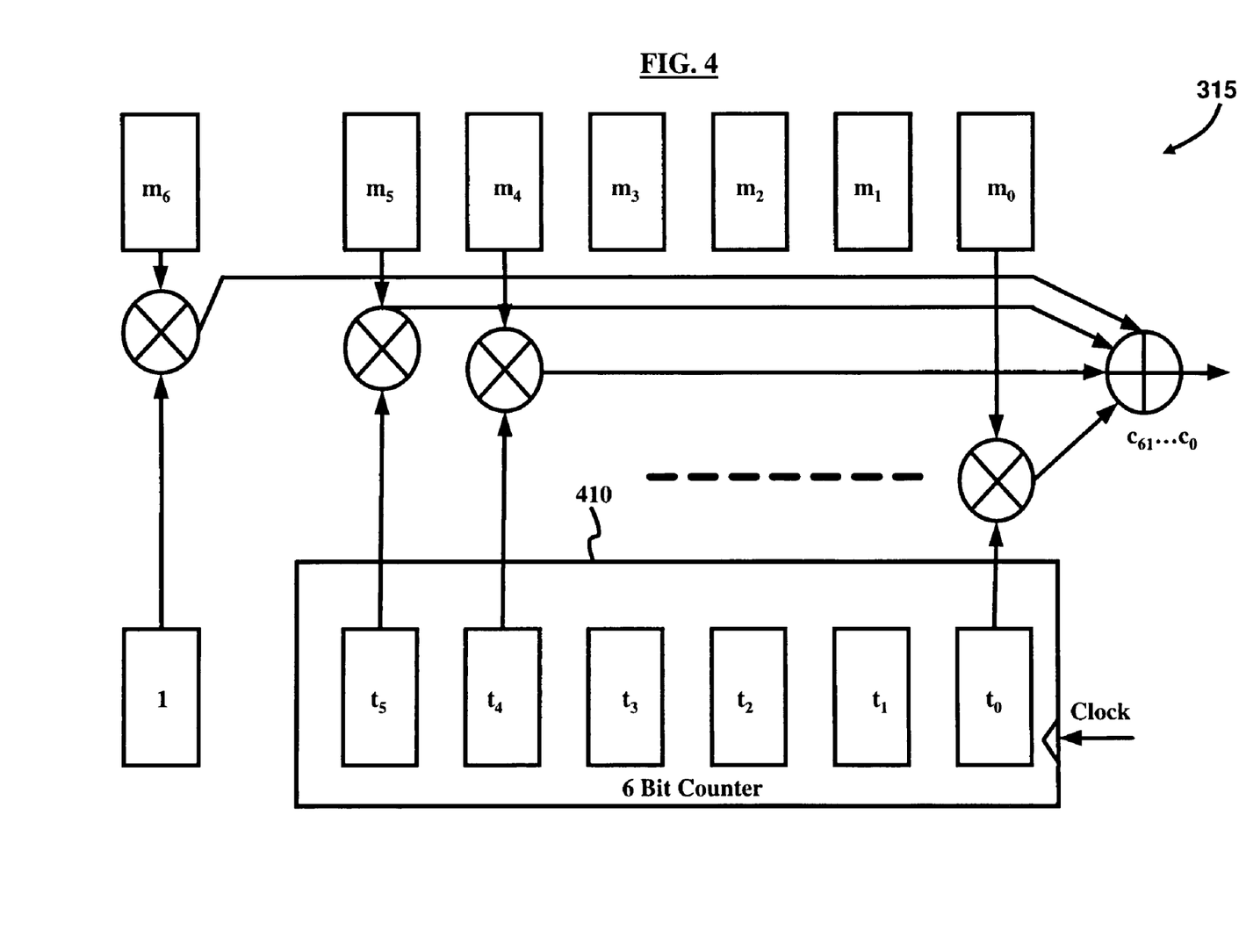
FIG. 4 illustrates a block diagram of the Reed-Muller encoder of FIG. 3 according to an embodiment herein.

FIG. 4 illustrates a block diagram of the Reed-Muller encoder 315 of FIG. 3 according to an embodiment herein. The Reed-Muller encoder 315 is a first order Reed-Muller encoder, where m=7 (input bits of 1 of 4 interleaved block parts) and code length=$2^{(7-1)}$ which is 64. A 6 bit counter 410 is used to count the 64 bits. However, the counter 410 stops at 62, so the encoder 315 removes the last two bits of the original (7, 64) Reed-Muller encoder. The Reed Muller encoder 315 is (7,64), i.e., the input is 7 bits (one block (of 4 blocks) of the output of the block interleaver) and encodes them to produce a code word of length 64 bits and the counter 410 is used to count the encoded bits until it reaches 62 bits and the last 2 bits are discarded.

In the reserved state the Reserved PPC MAC time unit is allocated all 8 slots with indices 0 through 7. The buffer for each of the 8 slots is completely filled with a fixed pattern comprising of 1000 bits. The bits of each allocated slot buffer are scrambled using the WID and the LID. In the reserved state, the modulation scheme that is used for the different slots is the quadrature phase-shift keying (QPSK) modulation scheme. The mapping of slots to interlaces may be an identity mapping. In other words, slots 0, 1, 2, 3, 4 and 6 are mapped to interlaces 0, 1, 2, 3, 4, and 6, respectively. The identity mapping is used even when the slot is mapped to multiple interlaces for the 1K and 2K FFT sizes. For the 8K FFT size, the two slots with index k in each PPC OFDM symbol are mapped to interlace k.

In the inactive state, for all FFT sizes, the PPC MAC time unit is allocated only one slot with index 7. For the 8K FFT size, slot 7 is allocated in both PPC MAC time units that correspond to the PPC OFDM symbol. The buffer for slot 7 may be completely filled with a fixed pattern comprising of 1000 bits. The bits of the allocated slot buffer may be scrambled using the WID. Furthermore, the modulation scheme that is used for the different slots is the QPSK modulation scheme.

Thus, to estimate the current location of a receiver 120 using PPC, the Time of Arrival of Signals (TD) emitted from three or more synchronized transmitters 110a-110c (of FIG. 5) at known locations are estimated at the receiver 120.

Figure 5:
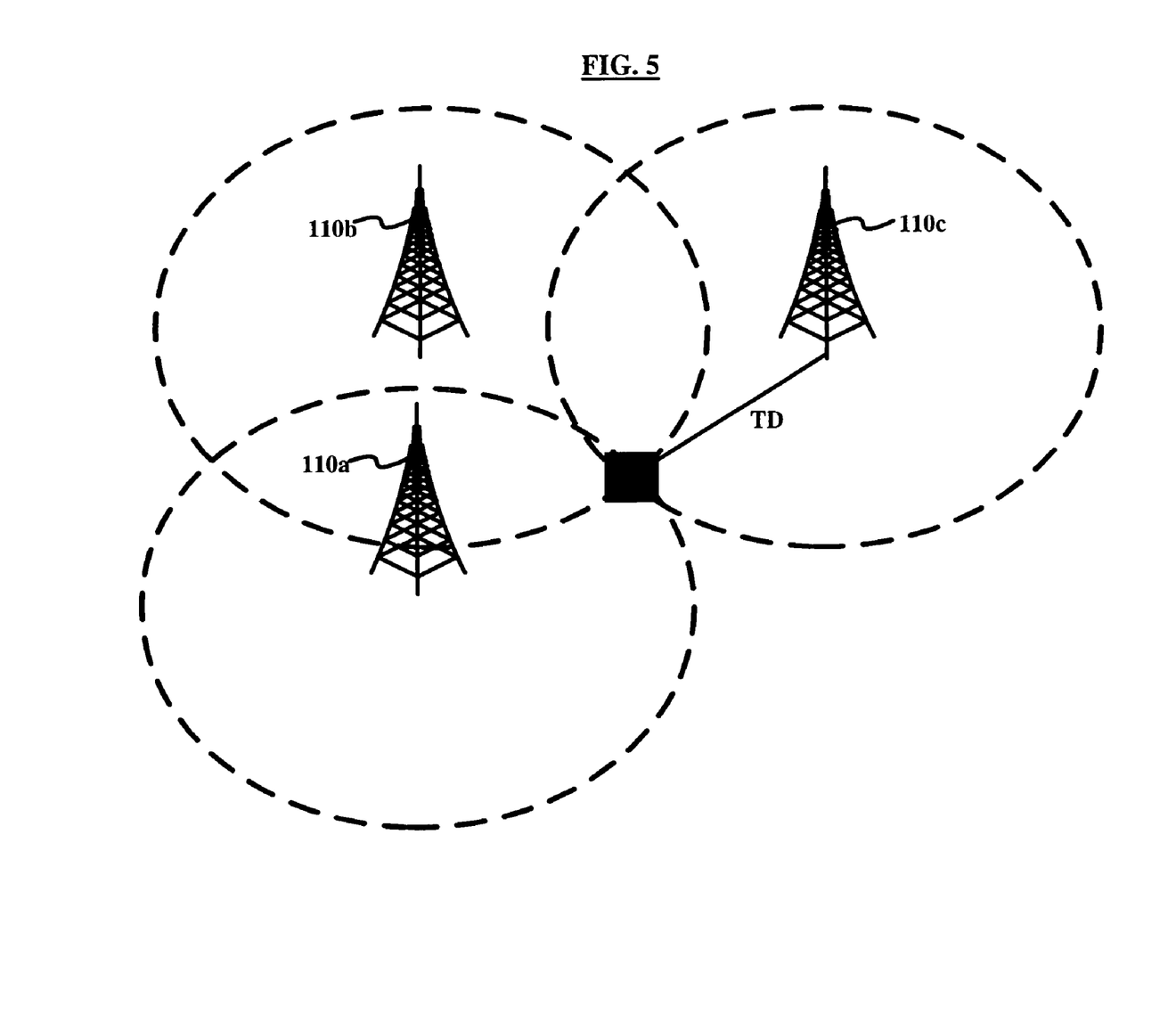
FIG. 5 illustrates the location of three transmitters according to an embodiment herein.

In one an embodiment, if (x, y, z) are the coordinates of the receiver 120, then TD may be obtained using the relation:

$$TD = \text{Receiver delay} + (1/c) * \sqrt{(x_1-x)^2 + (y_1-y)^2 + (z_1-z)^2}$$

where c is the speed of light and $(x_1, y_1, z_1)$ are the coordinates of the transmitter 120.

The location identification technique may use the Time Difference of Arrival (TDOA). This is a technique that computes the difference between the time delay of the signal first path from the transmitter 110 to the receiver 120 of a number of synchronized transmitters 110a-110c. The TDOA technique is used to remove the effect of the delay introduced at the receiver 120 due to the processing time of the received signal. This delay is constant among different receptions from different transmitters 110a-110c (of FIG. 5) and by using the TDOA technique this delay effect may be removed. Also, since there may be more than three transmitters 110 (e.g., there may be up to 8 different transmitters in the 4K FFT size), any delay estimate, which may not be accurate, may be excluded from the estimation.

FIG. 5 illustrates the location of three transmitters 110a-110c according to an embodiment herein. The transmitters 110a, 110b, 110c are located at coordinates (a, b), (d, e) and (f, g) respectively. Accordingly, the TDOA technique simultaneously solves two equations comprising two unknowns (the x and y coordinates of the receiver 120) knowing the location of the different transmitters 110a-110c as the z coordinate may be cancelled assuming that the three transmitters 110a-110c are coplanar which is the typical case. Then, $$TD1(Tx1) = \text{Receiver delay} + (1/c) * \sqrt{(a-x)^2 + (b-y)^2}$$

$$TD2(Tx2) = \text{Receiver delay} + (1/c) * \sqrt{(d-x)^2 + (e-y)^2}$$

$$TD3(Tx3) = \text{Receiver delay} + (1/c) * \sqrt{(f-x)^2 + (g-y)^2}$$

The TDOA technique computes the difference between TD2 and TD1 (τ1) and the difference between TD3 and TD1 (τ2) to calculate the (x, y). However, to apply the above mentioned technique, the following issues arise. The TDOA technique requires TD1, TD2, TD3 of the three transmitters 110a-110c, thus an algorithm is used to detect the TD of received signals from the different transmitters 110a-110c. Additionally, transmitted superframes 200 suffer from channel effects (fading, delay, multi path etc.,) and each transmitter 110a-110c is subjected to different channel effects which changes transmitter information leading to wrong computations of receiver location. Moreover, the TDOA technique uses the coordinates of the three transmitters 110a-110c, while each transmitter 110a-110c only sends its ID as identification.

Accordingly, in one embodiment, the time delay is determined through a simulation technique, where the first transmitter 110a is the nearest of the three transmitters 110a-110c to the receiver 120. In the simulation technique, the channel between each transmitter 110a-110c and the receiver 120 is just an echo channel, where the peak is delayed by an amount relative to the distance between that transmitter 110a-110c and the receiver 120.

Figure 6:
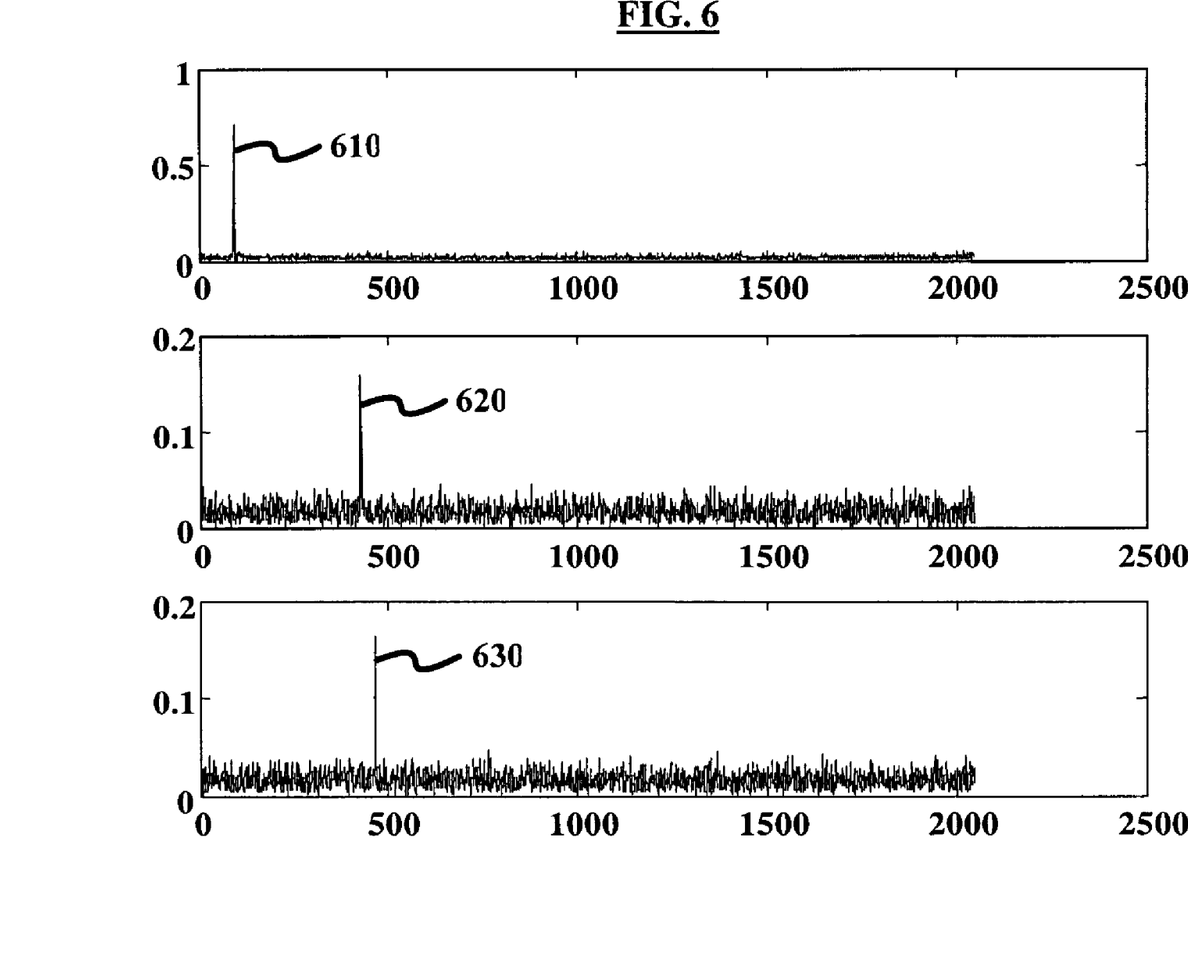
FIG. 6 illustrates channel estimates of three transmitter channels according to an embodiment herein.

FIG. 6 illustrates channel estimates of three transmitter channels according to an embodiment herein. To determine the time delay, the first peak 610, 620, 630 of the channel estimates illustrated in FIG. 6 may be detected. While determining the time delay it should be taken into consideration that the noise level may be high and that the first peak should be identified. In one embodiment, it is assumed that the first peak that is above a certain threshold level represents the first path of the channel. For this technique to be effective, a threshold level may be set for each channel, wherein the threshold level is a function of the signal-to-noise ratio (SNR) of the signal being transmitted.

Further, it is well known that slot 5 in each PPC MAC time unit is empty and the signal received during this slot represents the noise level. Thus, measuring the noise level at this slot and measuring the signal level during the other slots, the level of SNR may be obtained and hence set the threshold level to detect each peak. The accuracy of the technique to determine the peak and hence the location may depend on (i) the existence of the line of sight between the transmitter 110 and the receiver 120; and (ii) the level of the signal received comparing to the noise level.

In the technique provided by the embodiments herein, to determine the time delay, it is known that the receiver 120 is capable of identifying the transmitted signal during slots 0, 2, 4, and 6, as those slots are filled by fixed bit pattern scrambled by the WID and the LID. Therefore, the receiver 120 may estimate the channel in the frequency domain by dividing the received signal over the transmitted signal, whereby the result represents the channel in addition to the noise.

Further, it is known that the receiver 120 is able to identify the transmitted signal during slots 0, 2, 4, and 6, as those slots are filled by fixed bit pattern scrambled by the WID and the LID. Accordingly, the receiver 120 estimates the channel in the frequency domain by dividing the received signal over the transmitted signal, whereby the result represents the channel in addition to the noise. Thus, by estimating the channel, the effects may be removed.

To determine the coordinates of the three transmitters 110a-110c shown in FIG. 5, the locations of the transmitters 110-110c may be mapped to IDs of the transmitters 110a-110c. The map may be broadcasted by the FLO network 130 at a very low rate (within several superframes 200).

In one embodiment, the map may have a version number that is sent within the control information signaled to the receiver 120, to ensure updating the receiver 120 with any modifications in that map (such as a new transmitter 110 added to network 130 or changes in the location of the transmitter 110).

In another embodiment, the map may be stored on the receiver 120 in case the receiver 120 is not connected to the network; i.e., receiver 120 only receives (one way communication). The transmitter ID is translated to the location through this stored map when the received superframes 200 are processed. Furthermore, any modifications in the stored map may be sent to the receiver 120 by connecting the receiver 120 to the Internet.

In a further embodiment, the TDOA computations may be network assisted; i.e., the receiver 120 sends TD1, TD2, and TD3 to the network 130 which has the locations of the transmitters 110a-110c and then the computation results are sent back to the receiver 120.

Yet in a further embodiment, the network 130 may send the locations of the transmitters 110a-110c instead of the IDs of the transmitters 110-110c. As previously mentioned, slot 3 is used to convey 21 bits of information to the FLO receiver 120: 18 bits of information for the TxID. Slot 3 may be used to convey transmitter location which is described by longitude (23 bits), latitude (22 bits), and elevation (10 bits) in addition to a deliberate timing offset.

Figure 7:
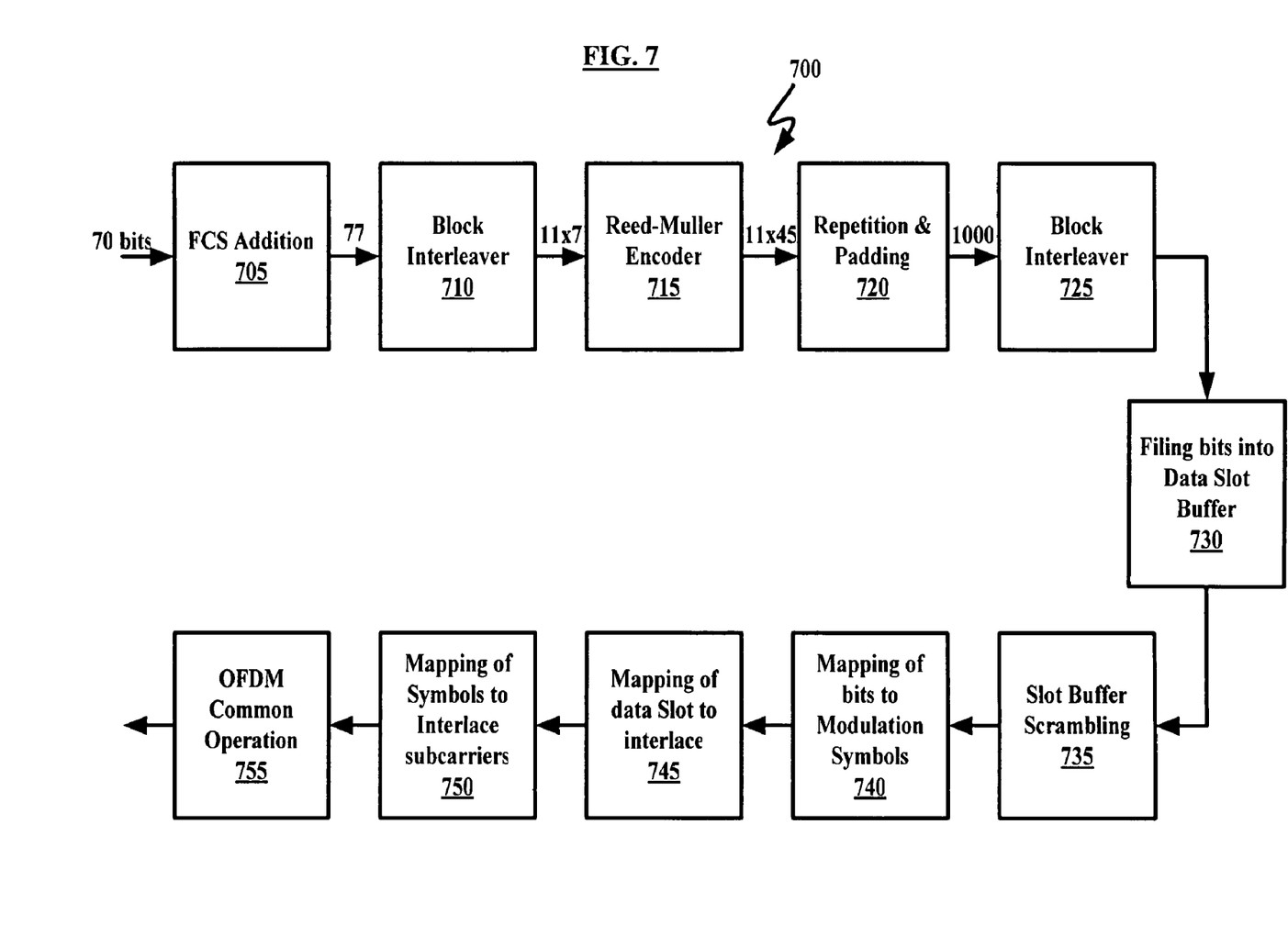
FIG. 7 illustrates a slot 3 processing according to an embodiment herein.

FIG. 7 illustrates a slot 3 processing 700 according to an embodiment herein. As illustrated in FIG. 7, the repetition and padding is less than the normal case (sending the TxID) as more information bits are needed for the location (70 instead of 21 bits). Accordingly, the robustness of the receiver 120 will be decreased; i.e., decrease in performance by 4.5 dB. The 70 bits contained in slot 3 undergo a FCS addition process 705, wherein 7 extra check sum bits are added to the PPC bits for error correction and detection. The FCS added bits are then block interleaved 710 so that the stream bits are converted into 11 interleaved blocks of 7 bits each to protect data against burst errors. The resulting bits are then encoded using a Reed-Muller encoder 715 for error correction. The Reed-Muller encoder 715 is (7,64); i.e., the input is 7 bits (one block of 11 of the interleaver output) to get an output encoded code word of 45 bits as a counter is used to discard 19 bits of the Reed-Muller (7,64) encoder instead of discarding only 2 in the ordinary operation. The encoded bits then undergo a repetition and padding process 720, wherein the data bits are repeated and padded with (filling) bits. The repetition and padding process 720 is less complex than an ordinary repetition and padding process as the input bits are 11×45=495 instead of 248 bits as in the repetition and padding process 320 of FIG. 3. The input bits are repeated and padded to get 1000 output bits, thus decreasing the degree of robustness of these transmitted bits decreases.

The resulting bits then undergo a block interleaving process 725 to protect data against burst errors. The interleaved bits are then filled into a data slot buffer 730. The buffer for the allocated slot is completely filled with a fixed pattern comprising 1000 bits, with each bit set to '0'. The buffers for the un-allocated slots are left empty.

The bits filled into the data slot buffer undergo a slot buffer scrambling process 735. The slot buffer scrambling 735 is performed by adding components to the original signal or by changing some important component of the original signal in order to make extraction of the original signal difficult. The degree of importance of a component is determined by slot buffer scrambling, wherein the bits of each allocated slot buffer are XOR'd sequentially with a variable scrambling sequence to randomize the bits prior to modulation.

The slot buffer scrambled bits are mapped 740 to modulation symbols, wherein each group of two consecutive bits from the scrambled slot buffer are mapped into a complex modulation symbol of QPSK modulation. The resulting bits then undergo a process of mapping 745 of data slot to interlace. There are eight interlaces in each OFDM symbol wherein seven of the interlaces are assigned to data slots 1 through 7. After the mapping 745 of data slot to interlace, the symbols are mapped 750 to interlace subcarriers, wherein each allocated slot contains 500 modulation symbols which are sequentially assigned to 500 interlace subcarriers. The resulting mapped symbols are processed for an OFDM common operation 755. As OFDM is a digital multi-carrier scheme, which uses a large number of closely-spaced orthogonal subcarriers, each subcarrier is modulated with a conventional modulation scheme.

In one embodiment, the network 130 may send either the transmitter location or TxID. The network 130 may signal the receiver 120 in the control channel information or the reserved flows symbols, such that one bit of the reserved bits in those symbols can indicate whether slot 3 in PPC symbols contain the transmitter location or TxID. Thus, the receiver 120 shall know the type of information contained in slot 3 and accordingly proceed with the corresponding processing shown in FIGS. 3 and 4. Further, the network 130 may decide whether to send the transmitter location or the TxID according to the conditions of the served receiver 120.

Figure 8:
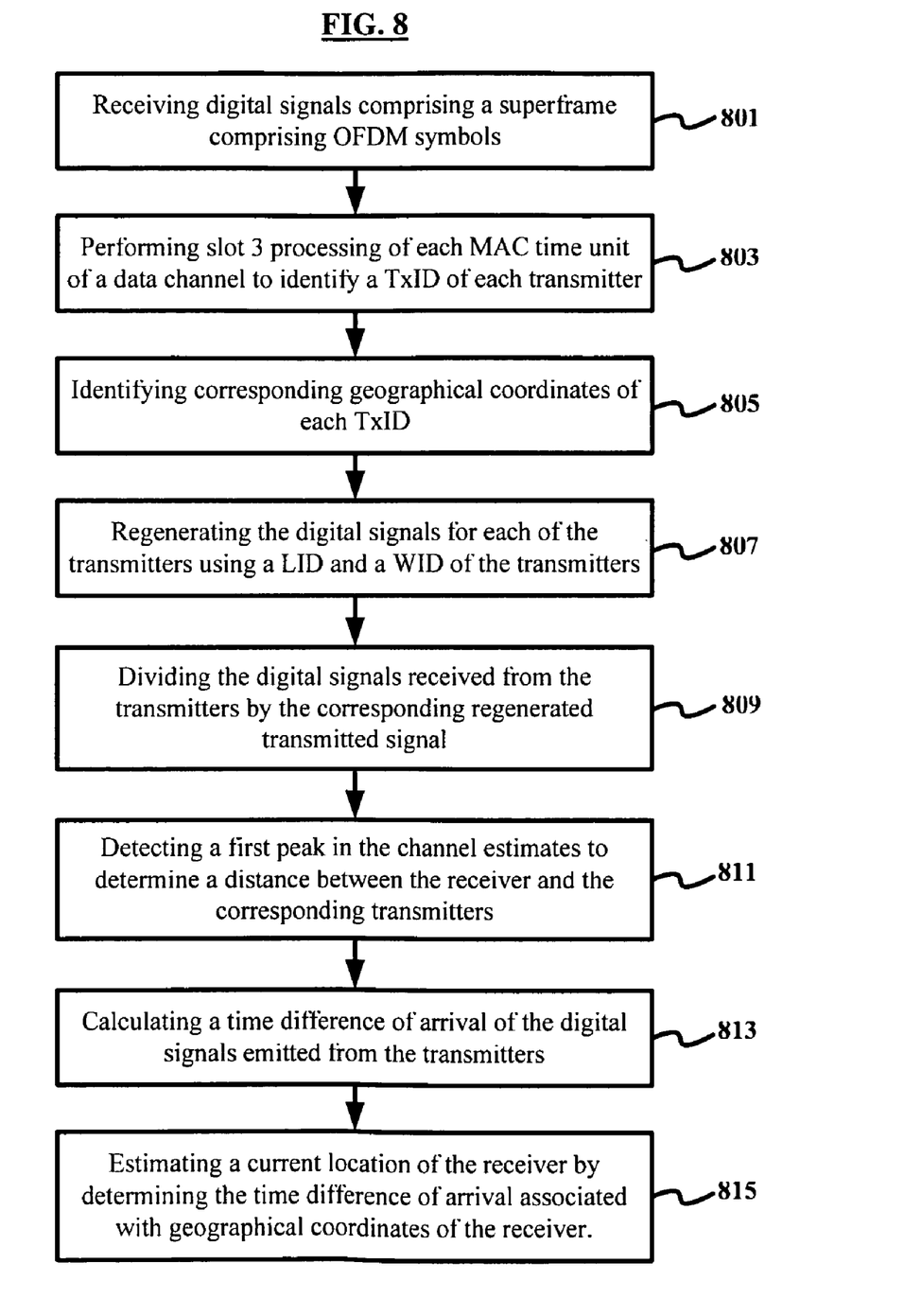
FIG. 8 is a flow diagram illustrating a preferred method according to an embodiment herein.

FIG. 8, with reference to FIGS. 1 through 7, is a flow diagram illustrating a method of estimating a current location of a receiver 120 in a MediaFLO™ (Forward Link Only) mobile multimedia multicast system 100 comprising the receiver 120, at least three transmitters 110*a*-110*c*, and a FLO network 130 according to an embodiment herein, wherein the method comprises receiving (801) digital signals comprising a MediaFLO™ mobile multimedia multicast system superframe 200 comprising orthogonal frequency division multiplexing (OFDM) symbols; performing (803) slot 3 processing of each medium access control (MAC) time unit of a data channel to identify a transmitter identity (TxID) of each transmitter 110*a*-110*c*; identifying (805) corresponding geographical coordinates of each TxID; regenerating (807) the digital signals for each of the transmitters 110*a*-110*c* using a local-area differentiator (LID) and a wide-area differentiator (WID) of the transmitters 110*a*-100*c*; dividing (809) the digital signals received from the transmitters 110*a*-110*c* by the corresponding regenerated transmitted signal to obtain channel estimates between the receiver 120 and the corresponding transmitters 110*a*-110*c*; detecting (811) a first peak in the channel estimates to determine a distance between the receiver 120 and the corresponding transmitters 110*a*-110*c*; calculating (813) a time difference of arrival of the digital signals emitted from the transmitters 110*a*-110*c*; and estimating (815) a current location of the receiver 120 by determining the time difference of arrival associated with geographical coordinates of the receiver 120.

Preferably, the slot 3 comprises 21 bits of information, wherein 18 bits represents the TxID and 3 bits represents a number of succeeding position pilot channel (PPC) MAC time units allocated to the transmitter 110 transmitting the slot 3. Moreover, identifying (805) the corresponding geographical coordinates of each TxID may comprise receiving a map of the locations of the transmitters 110*a*-110*c* and the identifiers of the transmitters 110*a*-110*c* broadcasted by the FLO network 130; storing the map into a memory component of the receiver 120; and translating the identified TxID of the transmitters 110*a*-110*c* to the locations of the transmitters 110*a*-110*c*.

The method may further comprise receiving a version number of the map within control information; and updating the map for any modifications. Additionally, the method may further comprise connecting the receiver 120 to the Internet; and updating the map for modifications. Preferably, detecting (811) the first peak in the channel estimates to determine the distance between the receiver 120 and the corresponding transmitters 110*a*-110*c* comprises measuring a noise level at slot 5 of the MAC time unit; measuring a signal level of the remaining slots of the MAC time unit; obtaining a level of the signal-to-noise ratio (SNR) of the digital signals; and setting a threshold level to detect each peak in the channel estimates.

Additionally, the calculating (813) of time difference of arrival may comprise determining a difference between a time difference of arrival corresponding to a first transmitter and a time difference of arrival corresponding to a second transmitter, and a difference between a time difference of arrival corresponding to the first transmitter and a time difference of arrival corresponding to a third transmitter. Moreover, the estimating (815) of current location of the receiver 120 may comprise transmitting the values of the time difference of arrival corresponding to the first, second, and third transmitters 110*a*-110*c* to the FLO network 130; and receiving the resulting coordinates indicating the current location of the receiver 120. Preferably, the receiving (801) of digital signals comprises receiving a bit to indicate whether slot 3 contains any of a transmitter 110 location and the TxID.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
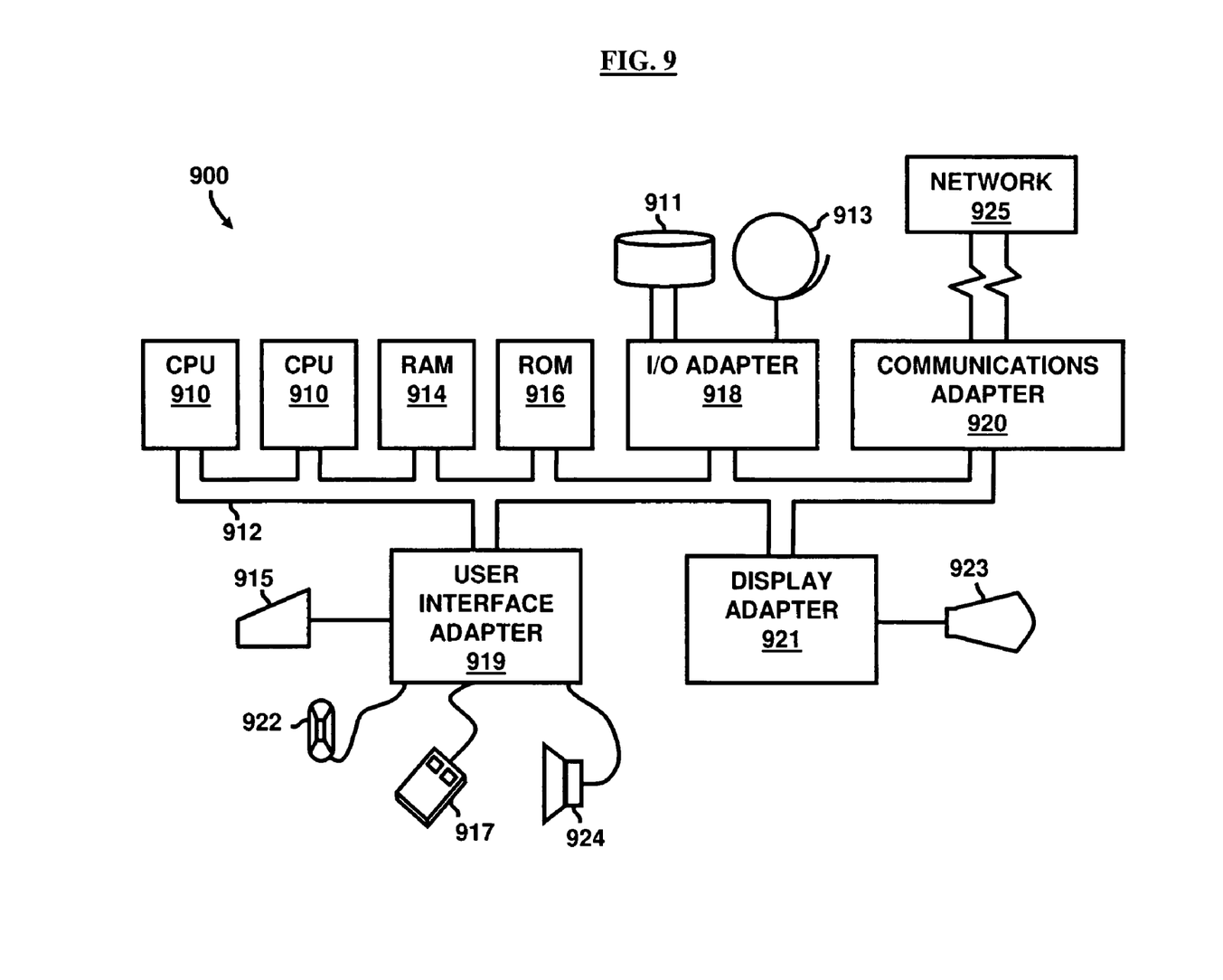
FIG. 9 illustrates a schematic diagram of a computer architecture used in accordance with the embodiments herein.

A representative hardware environment for practicing the embodiments herein is depicted in FIG. 9. This schematic drawing illustrates a hardware configuration of an information handling/computer system 900 in accordance with the embodiments herein. The system comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system can read the inventive instructions on the program storage devices and follow these instructions to execute the methodology of the embodiments herein. The system further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

Thus, the techniques described herein enable determining the geographical position of a receiver 120. The knowledge of the location of the receiver 120 makes the transmission of multi-media streams to mobile devices efficient. The power of the signals carrying the multi-media streams from different sources may be controlled as per the position of the transmitters 110a-110c in relation to the receiver 120.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of estimating a current location of a receiver in a mobile multimedia multicast system comprising said receiver, at least three transmitters, and a wireless network, said method comprising:

receiving digital signals comprising a mobile multimedia multicast system superframe comprising orthogonal frequency division multiplexing (OFDM) symbols;

performing slot 3 processing of each medium access control (MAC) time unit of a data channel to identify a transmitter identity (TxID) of each transmitter;

identifying corresponding geographical coordinates of each TxID;

regenerating said digital signals for each of said transmitters using a local-area differentiator (LID) and a wide-area differentiator (WID) of said transmitters;

dividing said digital signals received from said transmitters by the corresponding regenerated transmitted signal to obtain channel estimates between said receiver and the corresponding transmitters;

detecting a first peak in said channel estimates to determine a distance between said receiver and said corresponding transmitters, wherein the detecting comprises:

measuring a noise level at slot 5 of said MAC time unit;

measuring a signal level of the remaining slots of said MAC time unit;

obtaining a level of the signal-to-noise ratio (SNR) of said digital signals; and setting a threshold level to detect each peak in said channel estimates;

calculating a time difference of arrival of said digital signals emitted from said transmitters; and estimating a current location of said receiver by determining said time difference of arrival associated with geographical coordinates of said receiver.

2. The method of claim 1, wherein said slot 3 comprises 21 bits of information, wherein 18 bits represents said TxID and 3 bits represents a number of succeeding position pilot channel (PPC) MAC time units allocated to the transmitter transmitting said slot 3.

3. The method of claim 1, wherein identifying said corresponding geographical coordinates of each TxID comprises:
receiving a map of the locations of said transmitters and the identifiers of said transmitters broadcasted by said wireless network;
storing said map into a memory component of said receiver; and
translating the identified TxID of said transmitters to said locations of said transmitters.

4. The method of claim 3, further comprising:
receiving a version number of said map within a control information; and
updating said map for any modifications.

5. The method of claim 3, further comprising:
connecting said receiver to the Internet; and
updating said map for modifications.

6. The method of claim 1, wherein the calculating of time difference of arrival comprises determining a difference between a time difference of arrival corresponding to a first transmitter and a time difference of arrival corresponding to a second transmitter, and a difference between a time difference of arrival corresponding to said first transmitter and a time difference of arrival corresponding to a third transmitter.

7. The method of claim 6, wherein the estimating of current location of said receiver comprises:
transmitting the values of the time difference of arrival corresponding to the first, second, and third transmitters to said wireless network; and
receiving the resulting coordinates indicating said current location of said receiver.

8. The method of claim 1, wherein the receiving of digital signals comprises receiving a bit to indicate whether slot 3 contains any of a transmitter location and said TxID.

9. A program storage device readable by computer, tangibly embodying a program of instructions executable by said computer to perform an operation of estimating a current location of a receiver in a mobile multimedia multicast system comprising said receiver, at least three transmitters, and a wireless network, said operation comprising:
receiving digital signals comprising a mobile multimedia multicast system superframe comprising orthogonal frequency division multiplexing (OFDM) symbols;
performing slot 3 processing of each medium access control (MAC) time unit of a data channel to identify a transmitter identity (TxID) of each transmitter;
identifying corresponding geographical coordinates of each TxID;
regenerating said digital signals for each of said transmitters using a local-area differentiator (LID) and a wide-area differentiator (WID) of said transmitters;
dividing said digital signals received from said transmitters by the corresponding regenerated transmitted signal to obtain channel estimates between said receiver and the corresponding transmitters;
detecting a first peak in said channel estimates to determine a distance between said receiver and said corresponding transmitters, wherein the detecting comprises:
measuring a noise level at slot 5 of said MAC time unit;
measuring a signal level of the remaining slots of said MAC time unit;
obtaining a level of the signal-to-noise ratio (SNR) of said digital signals; and
setting a threshold level to detect each peak in said channel estimates;
calculating a time difference of arrival of said digital signals emitted from said transmitters; and
estimating a current location of said receiver by determining said time difference of arrival associated with geographical coordinates of said receiver.

10. The program storage device of claim 9, wherein said slot 3 comprises 21 bits of information, wherein 18 bits represents said TxID and 3 bits represents a number of succeeding position pilot channel (PPC) MAC time units allocated to the transmitter transmitting said slot 3.

11. The program storage device of claim 9, wherein identifying said corresponding geographical coordinates of each TxID comprises:
receiving a map of the locations of said transmitters and the identifiers of said transmitters broadcasted by said wireless network;
storing said map into a memory component of said receiver; and
translating the identified TxID of said transmitters to said locations of said transmitters.

12. The program storage device of claim 11, further comprising:
receiving a version number of said map within a control information; and
updating said map for any modifications.

13. The program storage device of claim 11, further comprising:
connecting said receiver to the Internet; and
updating said map for modifications.

14. The program storage device of claim 9, wherein the calculating of time difference of arrival comprises determining a difference between a time difference of arrival corresponding to a first transmitter and a time difference of arrival corresponding to a second transmitter, and a difference between a time difference of arrival corresponding to said first transmitter and a time difference of arrival corresponding to a third transmitter.

15. The program storage device of claim 14, wherein the estimating of current location of said receiver comprises:
transmitting the values of the time difference of arrival corresponding to the first, second, and third transmitters to said wireless network; and
receiving the resulting coordinates indicating said current location of said receiver.

16. The program storage device of claim 9, wherein the receiving of digital signals comprises receiving a bit to indicate whether slot 3 contains any of a transmitter location and said TxID.

17. An apparatus for estimating a current location of a wireless device in a mobile multimedia multicast system comprising at least three transmitters in a wireless network, said apparatus comprising:
a receiver that receives digital signals comprising a mobile multimedia multicast system superframe comprising orthogonal frequency division multiplexing (OFDM) symbols; and
a processor that:
performs slot 3 processing of each medium access control (MAC) time unit of a data channel to identify a transmitter identity (TxID) of each transmitter;

identifies corresponding geographical coordinates of each TxID;

regenerates said digital signals for each of said transmitters using a local-area differentiator (LID) and a wide-area differentiator (WID) of said transmitters;

divides said digital signals received from said transmitters by the corresponding regenerated transmitted signal to obtain channel estimates between said receiver and the corresponding transmitters;

detects a first peak in said channel estimates to determine a distance between said receiver and said corresponding transmitters, wherein the detecting comprises:
  measuring a noise level at slot 5 of said MAC time unit;
  measuring a signal level of the remaining slots of said MAC time unit;
  obtaining a level of the signal-to-noise ratio (SNR) of said digital signals; and
  setting a threshold level to detect each peak in said channel estimates;

calculates a time difference of arrival of said digital signals emitted from said transmitters; and estimates a current location of said receiver by determining said time difference of arrival associated with geographical coordinates of said receiver.

18. The apparatus of claim 17, wherein said slot 3 comprises 21 bits of information, wherein 18 bits represents said TxID and 3 bits represents a number of succeeding position pilot channel (PPC) MAC time units allocated to the transmitter transmitting said slot 3, and wherein said processor receives a map of the locations of said transmitters and the identifiers of said transmitters broadcasted by said wireless network, stores said map into a memory component of said receiver, and translates the identified TxID of said transmitters to said locations of said transmitters.

19. The apparatus of claim 17, wherein the calculating of a time difference of arrival comprises said processor determining a difference between a time difference of arrival corresponding to a first transmitter and a time difference of arrival corresponding to a second transmitter, and a difference between a time difference of arrival corresponding to said first transmitter and a time difference of arrival corresponding to a third transmitter.

20. The apparatus of claim 19, wherein the estimating of a current location of said receiver comprises said processor:
  transmitting the values of the time difference of arrival corresponding to the first, second, and third transmitters to said wireless network; and
  receiving the resulting coordinates indicating said current location of said receiver.

* * * * *